N. P. HOLMES.
Apparatus for Preserving Milk.
No. 57,721.  Patented Sept. 4, 1866.
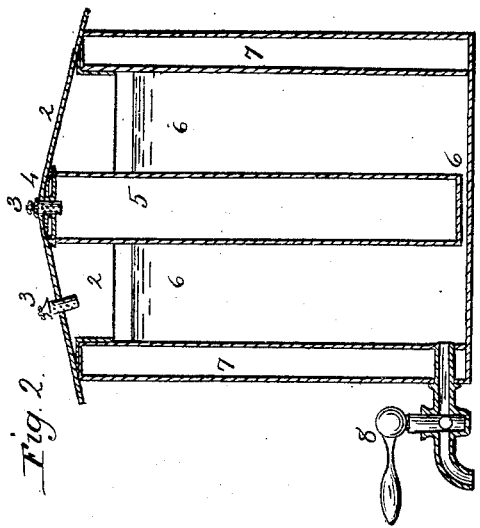
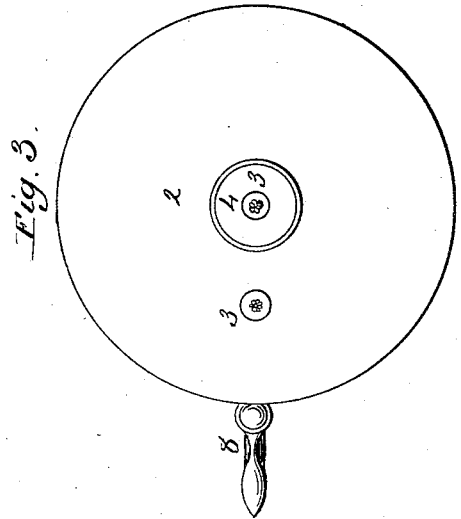
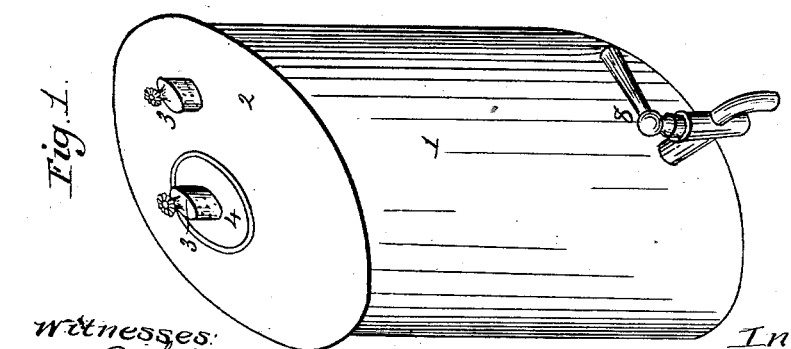

UNITED STATES PATENT OFFICE.

NOAH P. HOLMES, OF INDIANAPOLIS, INDIANA.

IMPROVED APPARATUS FOR PRESERVING MILK.

Specification forming part of Letters Patent No. 57,721, dated September 4, 1866.

*To all whom it may concern:*

Be it known that I, NOAH P. HOLMES, of Indianapolis, Marion county, State of Indiana, have invented a new and useful Mode of Preserving Milk; and I do hereby declare that the following is a full, clear, and exact description of the same, reference being had to the annexed drawings, and to the letters of reference marked thereon.

The nature of my invention consists in constructing a milk-can, 1, with double lining, and filling it with charcoal, 7 7, and by inserting through the center of the milk a cylinder containing ice, 5.

The lid of the can 2 is made portable. The lid of the cylinder 4, containing the ice, has a double lining, which is likewise filled with charcoal.

3 3 represent ventilators; 6 the milk, and 8 the faucet by means of which the milk is drawn. In large cans I place the ice into a lining inside of the charcoal lining, and surround the milk with ice. In that case the cylinder in the center of the milk is dispensed with.

This can will keep the milk cool in summer, and by taking out the tube in the can it will prevent the milk from freezing in winter.

What I claim, and desire to secure by Letters Patent of the United States, is—

The can 1, with its double lining 7 7 for charcoal, its cylinder with ice 5, separate lids 2 and 4, and ventilators 3 3, for the purpose described, and all arranged substantially as set forth.

NOAH P. HOLMES.

Witnesses:
HENRY R. HUEBNER,
JNO. L. SMITHMYER.